United States Patent
Huang et al.

(10) Patent No.: US 10,747,363 B2
(45) Date of Patent: Aug. 18, 2020

(54) TOUCH DISPLAY PANEL AND TOUCH DISPLAY DEVICE WITH BALANCED DISTRIBUTION OF COUPLING CAPACITANCE AND TOUCH ELECTRODES RECEIVE A COMMON VOLTAGE SIGNAL

(71) Applicants: Xiamen Tianma Micro-Electronics Co., Ltd., Xiamen (CN); Tianma Micro-Electronics Co., Ltd., Shenzhen (CN)

(72) Inventors: Zhipeng Huang, Xiamen (CN); Zhiwei Zheng, Xiamen (CN); Kangpeng Yang, Xiamen (CN); Lingzhi Su, Xiamen (CN); Yumin Xu, Xiamen (CN)

( * ) Notice: Subject to any disclaimer, the term of this patent is extended or adjusted under 35 U.S.C. 154(b) by 188 days.

(21) Appl. No.: 15/162,619

(22) Filed: May 24, 2016

(65) Prior Publication Data
US 2017/0212634 A1    Jul. 27, 2017

(30) Foreign Application Priority Data

Jan. 27, 2016    (CN) .......................... 2016 1 0055385

(51) Int. Cl.
*G06F 3/044*    (2006.01)
*G06F 3/041*    (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 2010/0300773 A1* | 12/2010 | Cordeiro | ................. | G06F 3/044 178/18.06 |
| 2014/0092051 A1* | 4/2014 | Weinerth | ................. | G06F 3/044 345/174 |
| 2015/0268795 A1* | 9/2015 | Kurasawa | ............. | G06F 3/0418 345/174 |
| 2015/0348486 A1* | 12/2015 | Suzuki | ................. | G09G 3/3677 345/174 |

(Continued)

FOREIGN PATENT DOCUMENTS

CN    103150070 A    6/2013

*Primary Examiner* — Amr A Awad
*Assistant Examiner* — Donna V Lui
(74) *Attorney, Agent, or Firm* — Kilpatrick Townsend & Stockton, LLP (57) ABSTRACT

A touch display panel is provided with a display area and a non-display area surrounding the display area. It includes an array substrate and a color film substrate arranged opposite to each other. The array substrate includes, in the display area, multiple first touch electrodes extending along a first direction and arranged in sequence along a second direction. The color film substrate includes, in the display area, multiple second touch electrodes extending along the second direction and arranged in sequence along the first direction. A ratio of a coupling capacitance in a direction perpendicular to the array substrate between the first touch electrodes and the second touch electrodes positioned in the display area close to the non-display area to that between the first touch electrodes and the second touch electrodes positioned in the display area far from the non-display area falls in between 0.9 and 1.1.

17 Claims, 6 Drawing Sheets (56) References Cited

U.S. PATENT DOCUMENTS

| | | | |
|---|---|---|---|
| 2016/0018931 A1* | 1/2016 | Kurasawa | G06F 3/044 345/174 |
| 2016/0109986 A1* | 4/2016 | Morein | G06F 3/0412 345/174 |
| 2017/0031490 A1* | 2/2017 | Hashida | G06F 3/041 |
| 2017/0168640 A1* | 6/2017 | Yamada | G09G 3/20 |

* cited by examiner

TOUCH DISPLAY PANEL AND TOUCH DISPLAY DEVICE WITH BALANCED DISTRIBUTION OF COUPLING CAPACITANCE AND TOUCH ELECTRODES RECEIVE A COMMON VOLTAGE SIGNAL

CROSS-REFERENCE TO RELATED APPLICATIONS

This application is based upon and claims priority to Chinese Patent Application 201610055385.0, filed Jan. 27, 2016, the entire contents of which are incorporated herein by reference.

TECHNICAL FIELD

The present disclosure relates to the field of display touch technologies, and more particularly, to a touch display panel and a touch display device.

BACKGROUND

Figure 1:
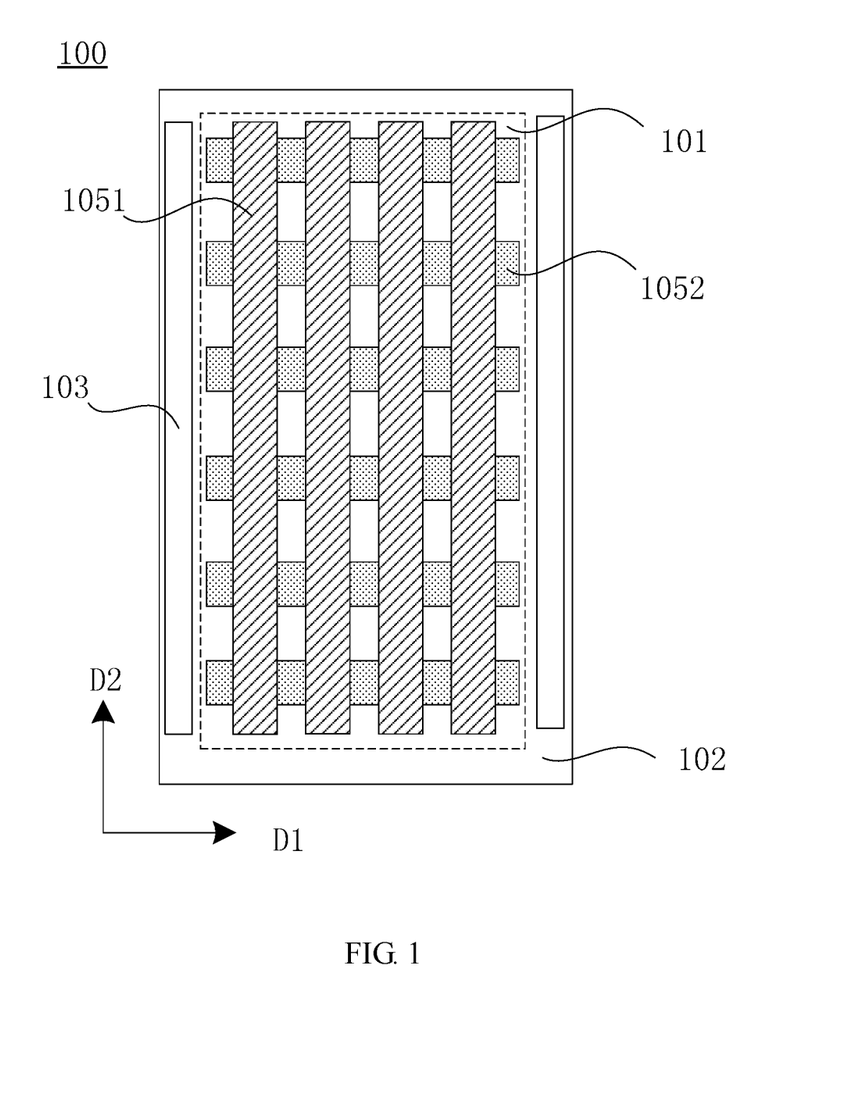
FIG. 1 is a block diagram illustrating a touch display panel in related art.

As an input medium, a touch display panel is a convenient human-computer interaction mode which is the simplest at present. Therefore, liquid crystal displays are integrated with the touch display function in more and more products. FIG. 1, is a block diagram illustrating a touch display panel in related art. As shown in FIG. 1, the touch display panel 100 includes a display area 101 and a non-display area 102 surrounding the display area 101, and the display area generally includes therein first touch electrodes 1051 and second touch electrodes 1052 that are crossed in the display area 101 along extension direction. The non-display area 102 includes a shift register 103 which consists of multiple cascade-connected shift register modules and typically is provided with a complex circuit structure. Due to the existence of the shift register 103, in the process of signal transmission, signal interference may be caused to the first touch electrodes 1051 and/or the second touch electrodes 1052 in the display area 101 close to the non-display area 102. This signal interference usually is embodied in coupling capacitance between the first touch electrodes 1051 and the second touch electrodes 1052, and the fluctuation of the coupling capacitance directly affects the touch accuracy of the touch display panel.

SUMMARY

On this account, in one aspect, the present disclosure provides a touch display panel, divided into a display area and a non-display area surrounding the display area, including an array substrate and a color film substrate arranged opposite to each other. The array substrate includes, in the display area, multiple first touch electrodes extending along a first direction and arranged in sequence along a second direction, and the color film substrate includes, in the display area, multiple second touch electrodes extending along the second direction and arranged in sequence along the first direction. a ratio between a coupling capacitance formed in a direction perpendicular to the array substrate between the first touch electrodes and the second touch electrodes positioned in the display area close to the non-display area to that formed in the direction perpendicular to the array substrate between the first touch electrodes and the second touch electrodes positioned in the display area far from the non-display area falls in between 0.9 and 1.1.

In another aspect, embodiments of the present disclosure further provide a touch display device, which includes the foregoing touch display panel.

According to the touch display panel and the touch display device provided by the embodiments of the present disclosure, the coupling capacitance formed in the direction perpendicular to the array substrate between the first touch electrodes and the second touch electrodes positioned in the display area far from the non-display area and between the first touch electrodes and the second touch electrodes positioned in the display area close to the non-display area may be balanced, such that the touch accuracy can be improved.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

To explain the technical contents of the present disclosure in more detail, a description is made as below by giving specific embodiments with reference to the accompanying drawings. However, the following drawings and embodiments are not intended to limit the present disclosure, and those skilled in the art may make some modifications and embellishments without departing from the spirit and scope of the present disclosure. Therefore, the scope of protection of the present disclosure shall be subject to the claims.

Figure 2A:
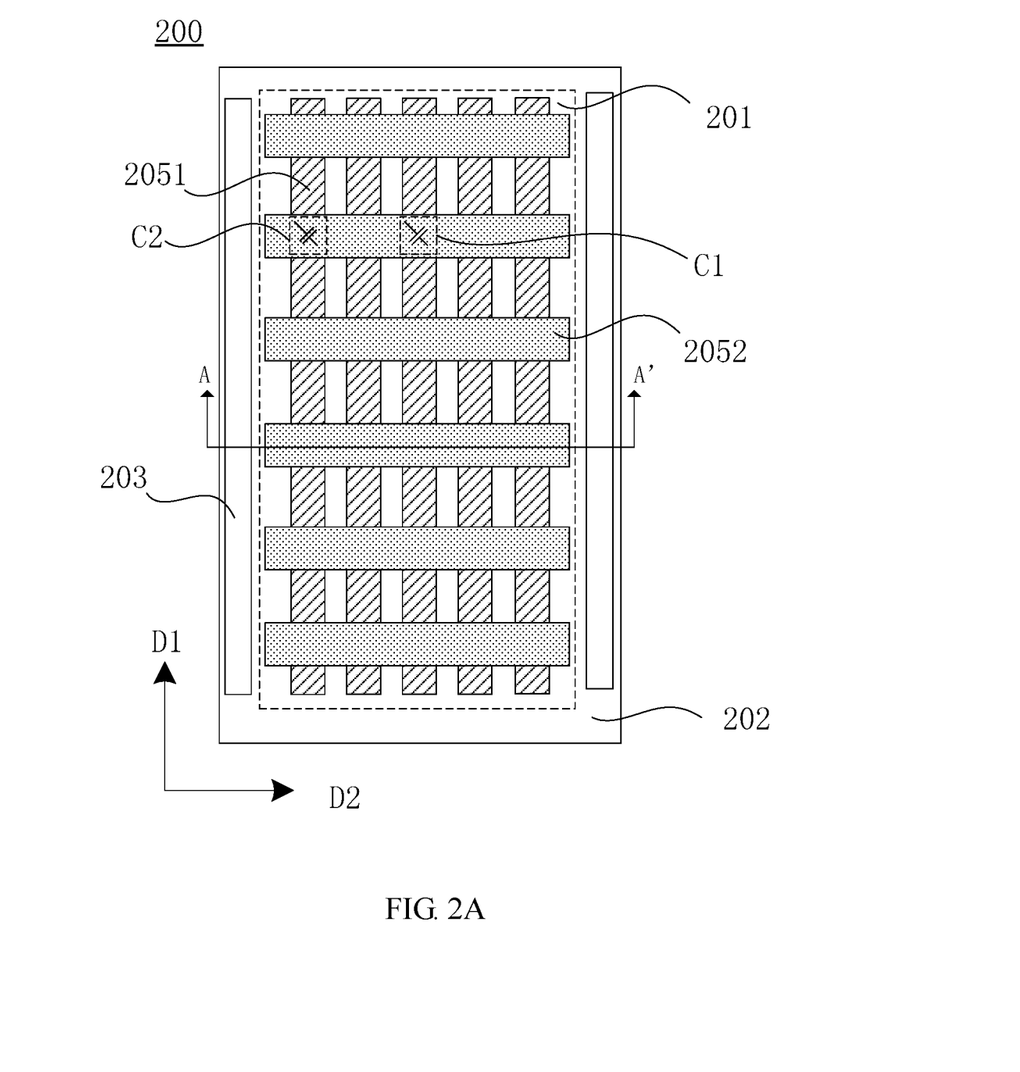
FIG. 2A illustrates a touch display panel according to an embodiment of the present disclosure.
Figure 2B:
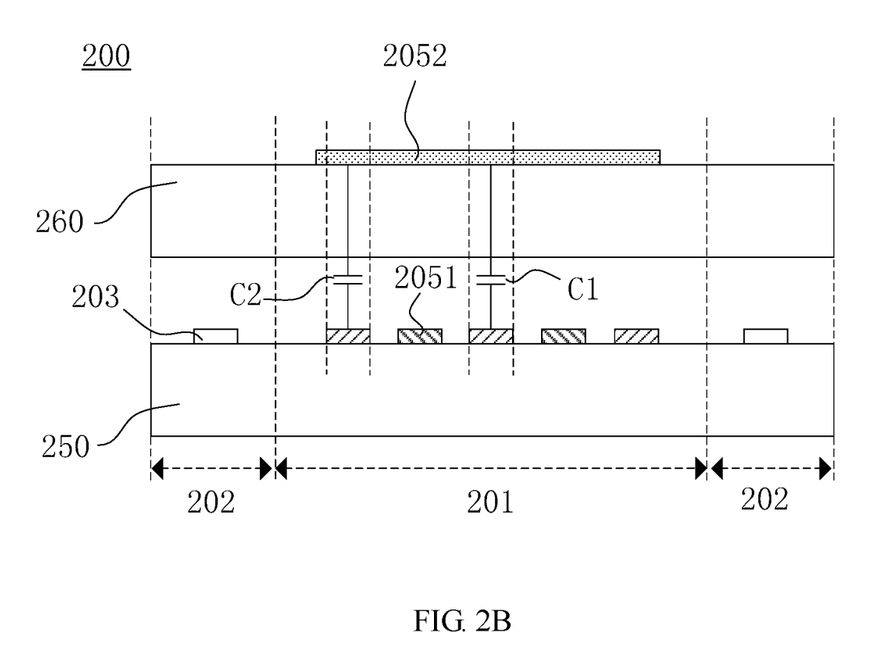
FIG. 2B illustrates a sectional view along a cutting line AA' in FIG. 2A.

FIG. 2A illustrates a touch display panel according to an embodiment of the present disclosure, and FIG. 2B is a sectional view along a cutting line AA' in FIG. 2A. In the following, reference is made to the touch display panel according to the embodiments of the present disclosure with reference to FIG. 2A and FIG. 2B. The touch display panel 200 includes an array substrate 250 and a color film substrate 260 arranged opposite to each other. As shown, both the array substrate 250 and the color film substrate 260 can be divided into a display area 201 and a non-display area 202 surrounding the display area 201. The array substrate 250 includes, in the display area 201, multiple first touch electrodes 2051 extending along a first direction D1 and arranged in sequence along a second direction D2. The color film substrate 260 includes, in the display area 201, multiple second touch electrodes 2052 extending along the second direction D2 and arranged in sequence along the first direction D1.

The non-display area 202 further includes a shift register 203. As previously mentioned, due to the existence of the shift register 203, in the process of signal transmission, signal interference may be caused to the first touch electrodes 2051 and/or the second touch electrodes 2052 in the display area 201 and close to the non-display area 202. This signal interference may be reflected by a coupling capacitance between the first touch electrodes 2051 and the second touch electrodes 2052, and fluctuation of the coupling capacitance directly affects the touch accuracy of the touch display panel. Referring to Table 1-1, which shows the coupling capacitance between the touch drive electrodes (TX1~TX16) and the touch detection electrodes (RX1~RX30) in the whole display area on the touch display panel. As can be seen from Table 1-1, the coupling capacitance formed in the direction perpendicular to the array substrate between the touch drive electrodes (TX2~TX15) and the touch detection electrodes (RX1~RX30) positioned in the display area far from the non-display area is approximately equal to 1. However, the coupling capacitance formed in the direction perpendicular to the array substrate between the touch drive electrodes (TX1 and TX16) and the touch detection electrodes (RX1~RX30) positioned in the display area close to the non-display area is approximately equal to 1.4. The reason for causing the inconsistency of the coupling capacitances is mainly due to, in addition to the error in the fabrication process, the existence of the shift register positioned in the non-display area. In the process of signal transmission, the shift register may cause signal interference to the touch drive electrodes (TX1 and TX16) and the touch detection electrodes (RX1~RX30) in the display area close to the non-display area, which extra increases the coupling capacitance between the touch drive electrodes (TX1~TX16) and the touch detection electrodes (RX1~RX30) and severely affects the touch accuracy.

Referring again to the embodiments corresponding to FIG. 2A and FIG. 2B in the present disclosure, the coupling capacitance formed in the direction perpendicular to the array substrate 250 between the first touch electrodes 2051 and the second touch electrodes 2052 positioned in the display area 201 far from the non-display area 203 is C1. The coupling capacitance formed in the direction perpendicular to the array substrate 250 between the first touch electrodes 2051 and the second touch electrodes 2052 positioned in the display area 201 close to the non-display area is C2. As test result indicates, when a ratio of the coupling capacitance C2 to the coupling capacitance C1 falls in between 0.9 and 1.1, the uniformity of the second coupling capacitance and between the coupling capacitance of the first touch electrodes and the second touch electrodes positioned in the display area close to the non-display area meets the requirements of the touch display panel for the touch accuracy, such that the touch accuracy can be improved.

TABLE 1-1

Coupling Capacitance between the Touch Drive Electrodes and the Touch Detection Electrodes on the Touch Display Panel

|  | TX1 | TX2 | TX3 | TX4 | TX5 | ... | TX12 | TX13 | TX14 | TX15 | TX16 |
|---|---|---|---|---|---|---|---|---|---|---|---|
| RX1 | 1.481 | 1.048 | 1.016 | 1.053 | 1.064 | ... | 0.978 | 1.074 | 1.051 | 1.02 | 1.47 |
| RX2 | 1.477 | 1.011 | 0.982 | 1.02 | 1.032 | ... | 0.94 | 1.045 | 1.016 | 1.08 | 1.49 |
| RX3 | 1.492 | 1.011 | 0.984 | 1.023 | 1.035 | ... | 0.943 | 1.048 | 1.02 | 1.081 | 1.487 |
| RX4 | 1.511 | 1.007 | 0.985 | 1.024 | 1.035 | ... | 0.946 | 1.053 | 1.021 | 1.081 | 1.498 |
| RX5 | 1.511 | 1.014 | 0.994 | 1.035 | 1.045 | ... | 0.952 | 1.062 | 1.032 | 1.088 | 1.514 |
| RX6 | 1.493 | 1.02 | 1.002 | 1.045 | 1.056 | ... | 0.962 | 1.078 | 1.043 | 1.093 | 1.525 |
| RX7 | 1.483 | 1.029 | 1.013 | 1.056 | 1.067 | ... | 0.972 | 1.09 | 1.053 | 1.1 | 1.538 |
| RX8 | 1.415 | 1.033 | 1.017 | 1.062 | 1.071 | ... | 0.976 | 1.091 | 1.056 | 1.103 | 1.498 |
| ... | ... | ... | ... | ... | ... | ... | ... | ... | ... | ... | ... |
| RX23 | 1.421 | 1.019 | 1.037 | 1.021 | 1.051 | ... | 0.991 | 1.042 | 1.026 | 1.109 | 1.466 |
| RX24 | 1.479 | 1.024 | 1.029 | 0.981 | 1.01 | ... | 1.036 | 1.033 | 0.986 | 1.033 | 1.49 |
| RX25 | 1.483 | 1.008 | 1.069 | 1.011 | 0.998 | ... | 1.093 | 1.072 | 0.979 | 1.094 | 1.485 |
| RX26 | 1.483 | 1.005 | 1.067 | 1.005 | 0.994 | ... | 1.088 | 1.068 | 0.976 | 1.093 | 1.474 |
| RX27 | 1.482 | 0.989 | 1.049 | 0.992 | 0.978 | ... | 1.075 | 1.058 | 0.963 | 1.081 | 1.463 |
| RX28 | 1.474 | 0.984 | 1.043 | 0.989 | 0.973 | ... | 1.075 | 1.056 | 0.96 | 1.078 | 1.452 |
| RX29 | 1.463 | 0.969 | 1.029 | 0.975 | 0.96 | ... | 1.065 | 1.048 | 0.944 | 1.065 | 1.447 |
| RX30 | 1.464 | 0.96 | 1.021 | 0.97 | 0.952 | ... | 1.061 | 1.046 | 0.937 | 1.059 | 1.438 |

In conclusion, according to the design of the embodiments of the disclosure as shown in FIG. 2A and FIG. 2B, the coupling capacitance formed in the direction perpendicular to the array substrate between the first touch electrodes and the second touch electrodes positioned in the display area far from the non-display area and between the first touch electrodes and the second touch electrodes positioned in the display area close to the non-display area may be balanced, and the touch accuracy can be improved.

Figure 3:
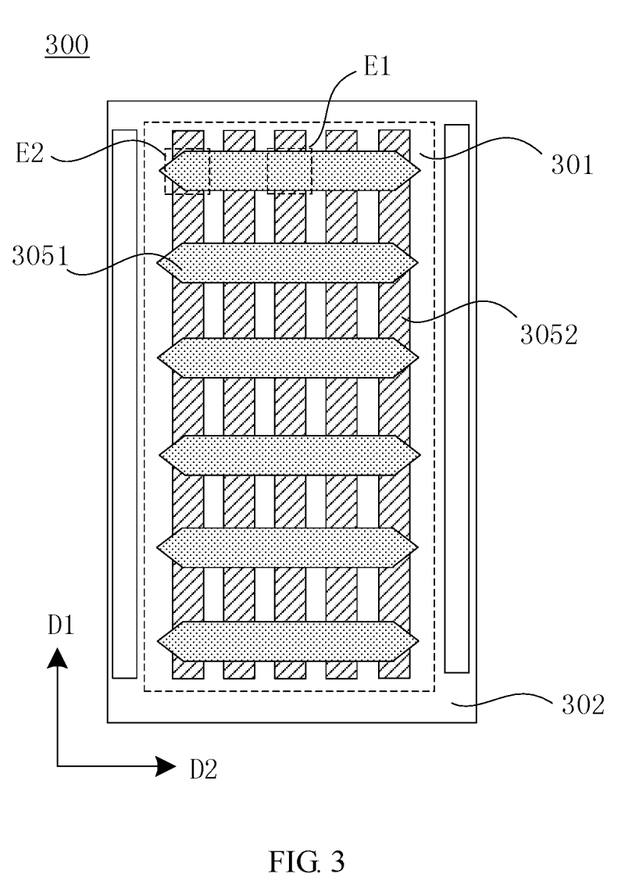
FIG. 3 illustrates a touch display panel according to another embodiment of the present disclosure.

FIG. 3 illustrates a touch display panel 300 according to another embodiment of the present disclosure. The same aspects between the touch display panel 300 and the touch display panel 200 in the embodiment in FIG. 2A are not repeated. Only the differentiated aspects between the embodiments shown in FIG. 2 and FIG. 3 will be described. The differentiated aspects lie at least in that there are multiple overlapping regions formed in the direction perpendicular to the array substrate by the first touch electrodes 3051 and the second touch electrodes 3052. In an embodiment, a first overlapping region E1 among the multiple overlapping regions is formed in the direction perpendicular to the array substrate by one of the first touch electrodes 3051 and one of the second touch electrodes 3052 positioned in the display area 301 far from the non-display area 302, a second overlapping region E2 among the multiple overlapping regions is formed in the direction perpendicular to the array substrate by one of the first touch electrodes 3051 and one of the second touch electrodes 3052 positioned in the display area 301 close to the non-display area 302, and the first overlapping region E1 is greater than the second overlapping region E2 in area. Due to the effect of the shift register positioned in the non-display area, the coupling capacitance between one of the first touch electrodes 3051 and one of the second touch electrodes 3052 positioned in the display area 301 far from the non-display area 302 is smaller than that between one of the first touch electrodes 3051 and one of the second touch electrodes 3052 positioned in the display area 301 close to the non-display area 302. It is known that the coupling capacitance between the first touch electrodes 3051 and the second touch electrodes 3052 is in direct proportion to a facing area between the first touch electrodes 3051 and the second touch electrodes 3052, namely, is in direct proportion to an overlapping area between the first touch electrodes 3051 and the second touch electrodes 3052 in the direction perpendicular to the array substrate. Therefore, according to the structural design in this embodiment, the coupling capacitance between the first touch electrodes and the second touch electrodes positioned in the display that and far from the non-display area and that between the first touch electrodes and the second touch electrodes positioned in the display area close to the non-display area in the direction perpendicular to the array substrate may be uniformized, and the touch accuracy can be improved.

Figure 4:
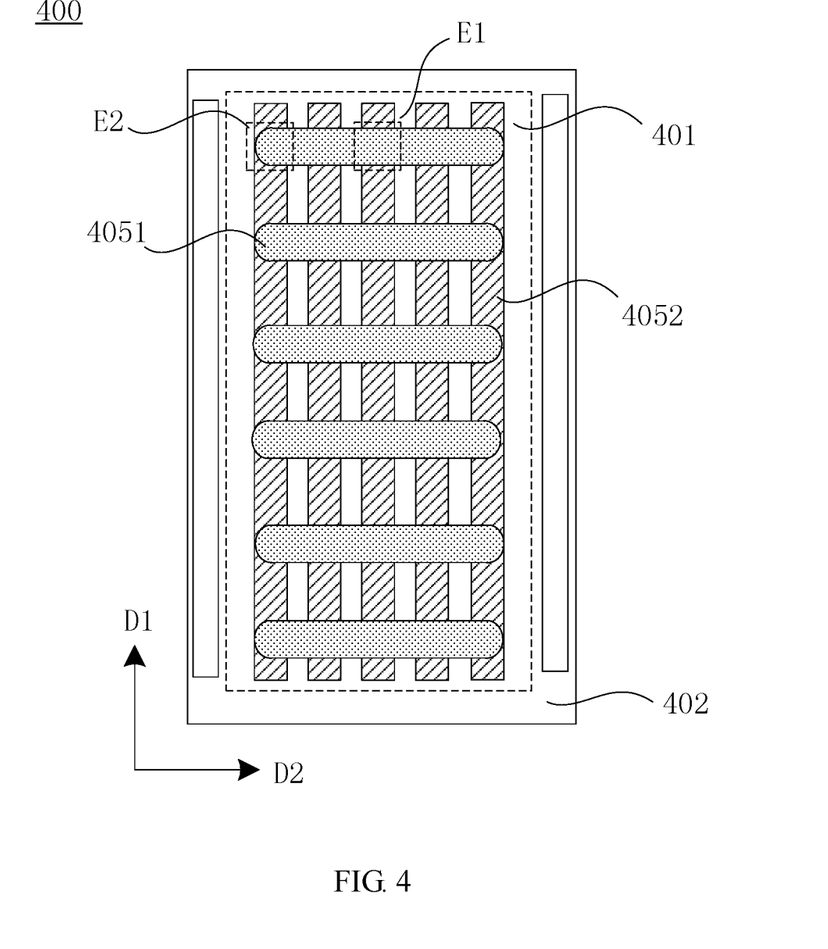
FIG. 4 illustrates a touch display panel according to another embodiment of the present disclosure.

It is to be noted that, in the embodiment as shown by FIG. 3, ends of the first touch electrodes 3051 positioned in the display area 301 close to the non-display area 302 are in the shape of a triangle. However, this is not intended to be limiting. The scope of the present disclosure is not limited thereto. As shown in FIG. 4, the ends of the first touch electrodes 4051 positioned in the display area 401 close to the non-display area 402 are in the shape of an arc circle, or the ends of the first touch electrodes positioned in the display area close to the non-display area may be in the shape of a trapezoid or the like. Alternatively, FIG. 3 and FIG. 4 show that the ends of the first touch electrodes 3051 positioned in the display area 301 close to the non-display area 302 are in the shape of a triangle, a circle or a trapezoid, but the overlapping regions formed by the first touch electrodes 3051 and the second touch electrodes 3052 positioned in the display area 301 close to the non-display area 302 along the direction perpendicular to the array substrate can be also in the shape of a triangle, a circle or a trapezoid, as long as the multiple overlapping regions are formed by the first touch electrodes and the second touch electrodes along the direction perpendicular to the array substrate, the first overlapping region among the multiple overlapping regions is formed by one of the first touch electrodes and one of the second touch electrodes positioned in the display area far from the non-display area along the direction perpendicular to the array substrate, the second overlapping region among the multiple overlapping regions is formed by one of the first touch electrodes and one of the second touch electrodes positioned in the display area close to the non-display area along the direction perpendicular to the array substrate, and the first overlapping region is greater than the second overlapping region in area. The ends of the first touch electrodes positioned in the display area close to the non-display area may be formed in any shape, which falls in the protection scope of the present disclosure, and is not enumerated herein.

Reference is now made to Table 1-2 to show touch amount attenuation ratios over different overlapping areas between the first touch electrodes and the second touch electrodes. It should be understood that table 1-2 does not provide widths of the second touch electrodes. Table 1-2 provides three different widths of the first touch electrodes. The width of the second touch electrodes may be deemed as a fixed constant. A first group of numerical values (one group consists of four numerical values in each row direction) are close to numerical values of actual products. In this example, the width of the first touch electrodes is 0.416 mm,
the overlapping area between the first touch electrodes. In this example, the second touch electrodes in the direction perpendicular to the array substrate is 0.178 mm$^2$, and the finger touch amount is 179 fF. No matter at the edge of the display area or in the middle position of the display area, the overlapping areas between the first touch electrodes and the second touch electrodes in the direction perpendicular to the array substrate are equal to each other. So, for a first group of numerical values, the touch amount attenuation ratio can be 1. As can be further seen from a second group of numerical values and a third group of numerical values, when the size of the second touch electrodes is constant, as the width of the first touch electrodes decreases, the overlapping area between the first touch electrodes and the second touch electrodes in the direction perpendicular to the array substrate gradually decreases. As the area decreases, the finger touch amount also decreases, and finally the touch amount attenuation ratio also decreases. It should be noted that, the touch amount attenuation ratio refers to a ratio calculated by taking the finger touch amount under the existing conditions as a denominator and the finger touch amount under other conditions as a numerator. With reference to Table 1-1, it has been mentioned previously that the coupling capacitance between the touch drive electrodes (TX1 and TX16) and the touch detection electrodes (RX1~RX30) positioned in the display area close to the non-display area in the direction perpendicular to the array substrate is approximately equal to 1.4; and the coupling capacitance between the touch drive electrodes (TX2~TX15) and the touch detection electrodes (RX1~RX30) positioned in the display area far from the non-display area in the direction perpendicular to the array substrate is approximately equal to 1. Therefore, a conclusion may be drawn: when the overlapping areas between the first touch electrodes and the second touch electrodes in the direction perpendicular to the array substrate are approximately equal to each other in the whole display area, the coupling capacitance between the first touch electrodes and the second touch electrodes positioned in the display area far from the non-display area is 0.7 time as large as that between the first touch electrodes and the second touch electrodes positioned in the display area close to the non-display area. Therefore, as to the third group of numerical values in Table 1-2, under the condition in which the touch amount attenuation ratio is 0.73, the coupling capacitance between the first touch electrodes and the second touch electrodes positioned in the display area far from the non-display area and that between the first touch electrodes and the second touch electrodes positioned in the display area close to the non-display area in the direction perpendicular to the array substrate may reach a relatively balanced state on the whole touch display panel. Moreover, under this condition, with reference to FIG. 3 and FIG. 4, the area of the second overlapping region E2 is 0.4-0.6 time as large as that of the first overlapping region E1.

Therefore, according to the design in the foregoing embodiment, multiple overlapping regions are formed by the first touch electrodes and the second touch electrodes in the direction perpendicular to the array substrate. A first overlapping region of the multiple overlapping regions is formed by one of the first touch electrodes and one of the second touch electrodes positioned in the display area far from the non-display area in the direction perpendicular to the array substrate. A second overlapping region of the multiple overlapping regions is formed by one of the first touch electrodes and one of the second touch electrodes positioned in the display area close to the non-display area in the direction perpendicular to the array substrate. When the area of the second overlapping region is 0.4-0.6 time as large as that of the first overlapping region, the coupling capacitance between the first touch electrodes and the second touch electrodes positioned in the display area far from the non-display area between the first touch electrodes and the second touch electrodes positioned in the display area close to the non-display area in the direction perpendicular to the array substrate may be better uniformized, and the touch accuracy can be further improved.

It is to be noted that the embodiments illustrated in FIG. 3 and FIG. 4 are just examples showing the ends of the first touch electrodes positioned in the display area close to the non-display area are formed in the shape of a triangle, a trapezoid or a circle. Table 1-2 just show examples to illustrate the width of the first touch electrodes decreases while the size of the second touch electrodes remains constant. However, the present disclosure is not limited to such design. Specifically, the shape or size of the first touch electrodes may be not changed, but the shape or size of the second touch electrodes is changed, and modification and combination of various shapes or sizes will be not described herein as long as multiple overlapping regions are formed between the first touch electrodes and the second touch electrodes in the direction perpendicular to the array substrate, the first overlapping region of the multiple overlapping regions is formed by one of the first touch electrodes and one of the second touch electrodes positioned in the display area far from the non-display area in the direction perpendicular to the array substrate, the second overlapping region of the multiple overlapping regions is formed by one of the first touch electrodes and one of the second touch electrodes positioned in the display area close to the non-display area in the direction perpendicular to the array substrate, and the first overlapping region is greater than the second overlapping region in area; or furthermore, as long as the area of the second overlapping region is 0.4-0.6 time as large as that of the first overlapping region.

TABLE 1-2

| Width of the first touch electrodes (mm) | Overlapping area (mm²) | Finger touch amount (fF) | Touch amount attenuation ratio |
| --- | --- | --- | --- |
| 0.416 | 0.178 | 179 | (179/179) = 1 |
| 0.3 | 0.129 | 156 | (156/179) = 0.86 |
| 0.2 | 0.086 | 132 | (132/179) = 0.73 |

Figure 5:
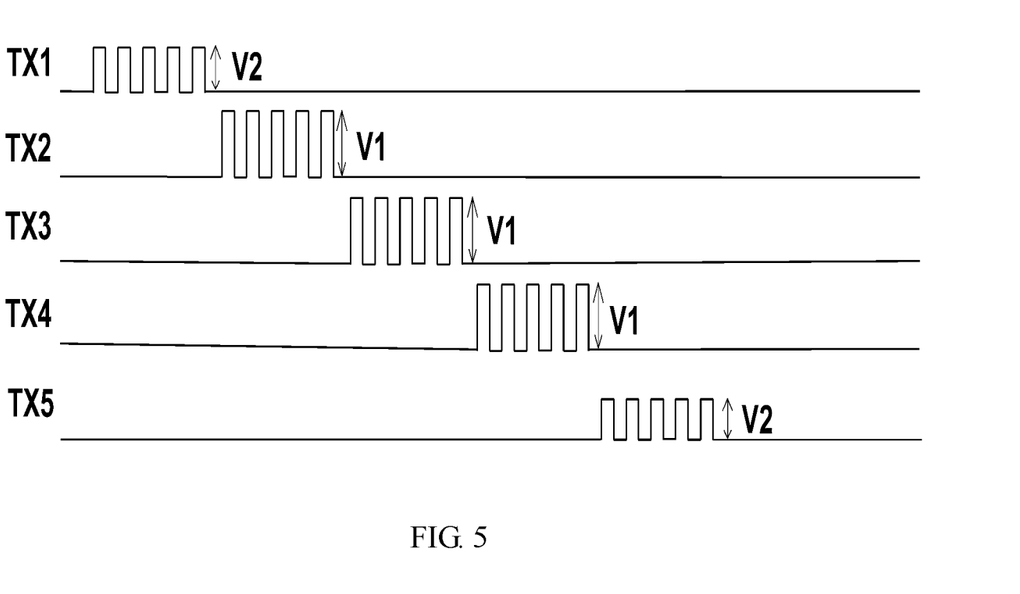
FIG. 5 is a schematic diagram illustrating reception of touch drive signal by a touch display panel according to an embodiment of the present disclosure.

Touch Amount Attenuation Ratios over Different Overlapping Areas between the First Touch Electrodes and the Second Touch Electrodes FIG. 5 is a schematic diagram illustrating reception of touch drive signal by the touch display panel according to an embodiment of the present disclosure. FIG. 5 is depicted with touch drive signal with different amplitudes received by five touch drive electrodes (TX1~TX5) and five touch drive electrodes (TX1~TX5) in a touch stage. With reference to FIG. 2, in this embodiment, it may be regarded that the five touch drive electrodes (TX1~TX5) respectively correspond, one by one, to five first touch electrodes 2051 arranged sequentially in parallel from left to right along the second direction D2 in FIG. 2. In FIG. 2, a left first one of the first touch electrodes 2051 positioned in the display area 201 close to the non-display area 202 is corresponding to TX1 in FIG. 5, and a right first one of the first touch electrodes 2051 positioned in the display area 201 close to the non-display area 202 is corresponding to TX5 in FIG. 5. A second touch drive signal with a voltage value of V2 is received by these two first touch electrodes 2051 when the touch display panel works at the touch stage. A left second one of the first touch electrodes 2051 to a left fourth one of the first touch electrodes 2051 positioned in the display area 201 far from the non-display area 202 are respectively corresponding to TX2~TX4 in FIG. 5. A first touch drive signal with a voltage value of V1 is received by these three first touch electrodes 2051 when the touch display panel works at the touch stage. The voltage value V1 of the first touch drive signal is greater than the voltage value V2 of the second touch drive signal.

According to the embodiment as shown in FIG. 5, the coupling capacitance between the first touch electrodes and the second touch electrodes positioned in the display area far from the non-display area and that between the first touch electrodes and the second touch electrodes positioned in the display area close to the non-display area in the direction perpendicular to the array substrate may be uniformized, and the touch accuracy can be improved.

Alternatively, Table 1-3 shows the touch amount attenuation ratios over different touch drive signals, in which there are provided four groups of touch amount attenuation ratio under different touch drive signals. In related art (the first group of data), the voltage value of the touch drive signal generally is 4.5V. In this case, by taking a certain product (the type of this product is not enumerated herein because it is not the key point in the discussion, and characteristics of the product do not limit the present disclosure) as an example, the finger touch amount is 179 fF, and the touch amount attenuation ratio in this case is desirably regarded as 1. As the voltage value of the touch drive signal decreases, the finger touch amount also decreases, and so does the touch amount attenuation ratio. With reference to Table 1-1, it has been mentioned previously that the coupling capacitance between the touch drive electrodes (TX1 and TX16) and the touch detection electrodes (RX1~RX30) positioned in the display area close to the non-display area in the direction perpendicular to the array substrate is approximately equal to 1.4, and the coupling capacitance between the touch drive electrodes (TX2~TX15) and the touch detection electrodes (RX1~RX30) positioned in the display area far from the non-display area in the direction perpendicular to the array substrate is approximately equal to 1. Therefore, a conclusion may be drawn: when the overlapping areas between the first touch electrodes and the second touch electrodes in the direction perpendicular to the array substrate are approximately equal to each other in the whole display area, the coupling capacitance between the first touch electrodes and the second touch electrodes positioned in the display area far from the non-display area is about 0.7 time as large as that between the first touch electrodes and the second touch electrodes positioned in the display area close to the non-display area. Therefore, as to the third group and the fourth group of numerical values in Table 1-3, under the condition in which the touch amount attenuation ratio falls in between 0.66 and 0.80, the coupling capacitance between the first touch electrodes and the second touch electrodes positioned in the display area far from the non-display area and the coupling capacitance between the first touch electrodes and the second touch electrodes positioned in the display area close to the non-display area in the direction perpendicular to the array substrate may reach a relatively balanced state on the whole touch display panel. In other words, under this condition, with reference to FIG. 5, the voltage value V1 of the first touch drive signal is 1.2-1.5 times as large as the voltage value V2 of the second touch drive signal.

According to the foregoing design scheme, the first touch drive signal is received in the touch stage by one of the first touch electrodes positioned in the display area far from the non-display area, and the second touch drive signal is received in the touch stage by one of the first touch electrodes positioned in the display area close to the non-display area, and the voltage value of the first touch drive signal is 1.2-1.5 times as large as that of the second touch drive signal, such that the coupling capacitance between the first touch electrodes and the second touch electrodes positioned in the display area far from the non-display area and that between the first touch electrodes and the second touch electrodes positioned in the display area close to the non-display area in the direction perpendicular to the array substrate may be better uniformized, and the touch accuracy can be better improved.

TABLE 1-3

| Touch drive signal (V) | Finger touch amount (fF) | Touch amount attenuation ratio |
|---|---|---|
| 4.5 | 179 | (179/179) = 1 |
| 4 | 166 | (166/179) = 0.92 |
| 3.5 | 144 | (144/179) = 0.80 |
| 3 | 119 | (119/179) = 0.66 |

Touch Amount Attenuation Ratio of the Touch Display Panel over Different Touch Drive Signals It is to be noted that, for any one of the foregoing embodiments, the array substrate can further include a common electrode layer which can be divided, along the second direction D2, into multiple common electrodes insulated to each other and extending along the first direction D1. In an embodiment, the common electrodes may be also used as the first touch electrodes in any one of the foregoing embodiments. Specifically, when the touch display panel works in the display stage, the first touch electrodes may be configured to receive a common voltage signal; and in the touch stage, the first touch electrodes may be configured to receive a touch drive signal, while the second touch electrodes may be configured to output a touch detection signal based on the touch drive signal received by the first touch electrodes. Alternatively, in the display stage, the first touch electrodes may be configured to receive the common voltage signal; and in the touch stage, the second touch electrodes may be configured to receive the touch drive signal, while the first touch electrodes may be configured to output the touch detection signal based on the touch drive signal received by the second touch electrodes.

It is also noted that, for any one of the foregoing embodiments, the position of the first touch electrodes may be as shown in FIG. 2B. That is, the first touch electrodes 2051 may be disposed on one side of the array substrate 205 facing toward the color film substrate 260, and the second touch electrodes 2052 are disposed on one side of the color film substrate 260 far from the array substrate 205. However, what is shown in FIG. 2B is not intended to be limiting. For example, the first touch electrodes may be disposed on one side of the array substrate facing toward the color film substrate, and the second touch electrodes may be disposed on one side of the color film substrate facing toward the array substrate.

It is also noted that, for any one of the foregoing embodiments, the array substrate may further include gate scanning lines disposed along the traverse direction and data signal lines disposed along the longitudinal direction. In an embodiment, the gate scanning lines may be arranged in parallel with the second direction, and the data signal lines may be arranged in parallel with the first direction. Alternatively, the gate scanning lines may be arranged in parallel with the first direction, and the data signal lines may be arranged in parallel with the second direction.

It is also noted that the non-display area as mentioned in the embodiments of the present disclosure is mainly referred to as the non-display area positioned at two sides of the display area. This is because in a general structural design, the shift registers are typically disposed in the non-display area at two sides of the display area. However, the description of the non-display area in the foregoing embodiments does not specifically limit the position thereof. For example, the non-display area may be located at the upper or lower position of the display area, depending on the position in which the shift registers are disposed. The discussion is focused on the impact from the position of the shift registers on the coupling capacitance between the touch electrodes close to the shift registers. Therefore, any other definition of the non-display area falls within the protection scope of the embodiments of the present disclosure, which is not enumerated herein.

It is also noted that FIG. 2A and FIG. 2B show two shift registers 203 in the non-display area 202 at two sides of the display area 201. However, the quantity and position of the shift registers do not limit the embodiments of the present disclosure. For example, there may be only one shift register 203 which is positioned in the non-display area at one side of the display area 201. Any other design of the shift registers falls within the protection scope of the embodiments of the present disclosure, which is not enumerated herein.

It is noted that the foregoing embodiments are just illustrations of embodiments of the present disclosure and technical principles used thereby. Those skilled in the art may understand that the present disclosure is not limited to the specific embodiments described herein, and may make various modifications, readjustments and substitutions without departing from the protection scope of the present disclosure. Therefore, although reference is made to the present disclosure in more detail in the foregoing embodiments, the present disclosure is not merely limited to the foregoing embodiments, and many other equivalent embodiments may be further included without departing from the conception of the present disclosure, and the scope of the present disclosure depends on the scope of appended claims.

What is claimed is:

1. A touch display panel, provided with a display area and a non-display area surrounding the display area, comprising:
an array substrate and a color film substrate that are arranged on opposite to each other, wherein the array substrate comprises, in the display area, multiple touch drive electrodes extending along a first direction and arranged in sequence along a second direction, and the color film substrate comprises, in the display area, multiple touch detection electrodes extending along the second direction and arranged in sequence along the first direction; and,
the non-display area further comprises a shift register,
wherein, a ratio between a first coupling capacitance and a second coupling capacitance falls between 0.9 and 1.1, the first coupling capacitance being in a direction perpendicular to the array substrate between the touch drive electrodes and the touch detection electrodes positioned in the display area that are close to the shift register, and the second coupling capacitance being in the direction perpendicular to the array substrate between the touch drive electrodes and the touch detection electrodes positioned in the display area that are far from the shift register,
wherein the array substrate comprises a common electrode layer, the common electrode layer divided along the second direction, into multiple common electrodes insulated to each other, and the touch drive electrodes are used as the common electrodes,
wherein the touch drive electrodes comprise at least one central electrode positioned in a center display area far from the shift register, at least one first side electrode positioned at one side of the at least one central electrode, and at least one second side electrode positioned at another side of the at least one central electrode,
wherein in a display stage, the touch drive electrodes are configured to receive a common voltage signal, and
wherein in a touch stage, the at least one first side electrode is configured to receive a second touch drive square signal during a first time period, the at least one central electrode is configured to receive a first touch drive square signal during a second time period after the first time period, and the at least one second side electrode is configured to receive the second touch drive square signal during a third time period after the second time period, the first coupling capacitance, formed between the at least one first side electrode and the touch detection electrodes or between the at least one second side electrode and the touch detection electrodes, and the second coupling capacitance, formed between the at least one central electrode and the touch detection electrodes, are uniformized by modulating an amplitude of the first touch drive square signal as being greater than an amplitude of the second touch drive square signal.

2. The touch display panel as claimed in claim 1, wherein the second coupling capacitance is equal to the first coupling capacitance in the direction perpendicular to the array substrate between the touch drive electrodes and the touch detection electrodes positioned in the display area.

3. The touch display panel as claimed in claim 1, wherein multiple overlapping regions are formed in the direction perpendicular to the array substrate by the touch drive electrodes and the touch detection electrodes,
a first overlapping region of the multiple overlapping regions is formed in the direction perpendicular to the array substrate by one of the touch drive electrodes and one of the touch detection electrodes positioned in the display area that are far from the shift register,
a second overlapping region of the multiple overlapping regions is formed in the direction perpendicular to the array substrate by one of the touch drive electrodes and one of the touch detection electrodes positioned in the display area that are close to the shift register,
and an area of the first overlapping region is greater than an area of the second overlapping region.

4. The touch display panel as claimed in claim 3, wherein the area of the second overlapping region is 0.4-0.6 time as large as the area of the first overlapping region.

5. The touch display panel as claimed in claim 3, wherein the one of the touch drive electrodes positioned in the display area close to the shift register is located at outermost of all the touch drive electrodes; and the one of the touch drive electrodes positioned in the display area far from the shift register is selected from any one of the first touch drive electrodes not at outermost of all the touch drive electrodes.

6. The touch display panel as claimed in claim 4, wherein ends of the touch detection electrodes positioned in the display area close to the shift register are in a shape of a triangle, a trapezoid or a circle, enabling each of the touch detection electrodes to have a smaller area at two ends than at middle part.

7. The touch display panel as claimed in claim 4, wherein the overlapping regions formed in the direction perpendicular to the array substrate by the first touch drive electrodes and the touch detection electrodes positioned in the display area close to the shift register are in a shape of a triangle, a circle or a trapezoid, enabling overlapping regions at two ends of each of the touch detection electrodes to have a smaller area than overlapping regions at a middle part of each of the touch detection electrodes.

8. The touch display panel as claimed in claim 1, wherein the amplitude of the first touch drive square signal is 1.2-1.5 times as large as the amplitude of the second touch drive square signal.

9. The touch display panel as claimed in claim 1, wherein the touch drive electrodes are disposed at one side of the array substrate facing toward the color film substrate, and the touch detection electrodes are disposed at one side of the color film substrate far from the array substrate; or
the touch drive electrodes are disposed at one side of the array substrate facing toward the color film substrate, and the touch detection electrodes are disposed at one side of the color film substrate facing toward the array substrate.

10. The touch display panel as claimed in claim 1, wherein in the touch stage, the second touch drive signal is applied to a first touch drive electrode adjacent a shift register and adjacent a second touch drive electrode, the first touch drive signal is applied to the second touch drive electrode adjacent the first touch drive electrode and adjacent a third touch drive electrode, the first touch drive signal is applied to the third touch drive electrode adjacent the second touch drive electrode and adjacent a fourth touch drive electrode, the first touch drive signal is applied to the fourth touch drive electrode adjacent the third touch drive electrode and adjacent a fifth touch drive electrode, and the second touch drive signal is applied to the fifth touch drive electrode adjacent to the fourth touch drive electrode and adjacent another shift register.

11. A touch display device, comprising a touch display panel, wherein the touch display panel is provided with a display area and a non-display area surrounding the display area and comprises:
an array substrate and a color film substrate that are arranged on opposite to each other, wherein the array substrate comprises, in the display area, multiple touch drive electrodes extending along a first direction and arranged in sequence along a second direction, and the color film substrate comprises, in the display area, multiple touch detection electrodes extending along the second direction and arranged in sequence along the first direction; and,
the non-display area further comprises a shift register,
wherein, a ratio between a first coupling capacitance and a second coupling capacitance falls between 0.9 and 1.1, the first coupling capacitance being in a direction perpendicular to the array substrate between the touch drive electrodes and the touch detection electrodes positioned in the display area that are close to the shift register, and the second coupling capacitance being in the direction perpendicular to the array substrate between the touch drive electrodes and the touch detection electrodes positioned in the display area that are far from the shift register, wherein the array substrate comprises a common electrode layer, the common electrode layer divided along the second direction, into multiple common electrodes insulated to each other, and the touch drive electrodes are used as the common electrodes, wherein the touch drive electrodes comprise at least one central electrode positioned in a center display area far from the shift register, at least one first side electrode positioned at one side of the at least one central electrode, and at least one second side electrode positioned at another side of the at least one central electrode, wherein in a display stage, the touch drive electrodes are configured to receive a common voltage signal, and wherein in a touch stage, the at least one first side electrode is configured to receive a second touch drive square signal during a first time period, the at least one central electrode is configured to receive a first touch drive square signal during a second time period after the first time period, and the at least one second side electrode is configured to receive the second touch drive square signal during a third time period after the second time period, the first coupling capacitance, formed between the at least one first side electrode and the touch detection electrodes or between the at least one second side electrode and the touch detection electrodes, and the second coupling capacitance, formed between the at least one central electrode and the touch detection electrodes, are uniformized by modulating an amplitude of the first touch drive square signal as being greater than an amplitude of the second touch drive square signal.

12. A touch display panel, provided with a display area and a non-display area surrounding the display area, comprising:

an array substrate and a color film substrate that are arranged on opposite to each other, wherein the array substrate comprises, in the display area, multiple touch drive electrodes extending along a first direction and arranged in sequence along a second direction, and the color film substrate comprises, in the display area, multiple touch detection electrodes extending along the second direction and arranged in sequence along the first direction; and, the non-display area further comprises a shift register, wherein, a ratio between a first coupling capacitance and a second coupling capacitance falls between 0.9 and 1.1, the first coupling capacitance being in a direction perpendicular to the array substrate between the touch drive electrodes and the touch detection electrodes positioned in the display area that are close to the shift register, and the second coupling capacitance being in the direction perpendicular to the array substrate between the touch drive electrodes and the touch detection electrodes positioned in the display area that are far from the shift register, wherein the array substrate comprises a common electrode layer, the common electrode layer divided along the second direction, into multiple common electrodes insulated to each other, and the touch drive electrodes are used as the common electrodes, wherein the touch drive electrodes consist of at least one central electrode positioned in a center display area far from the shift register, at least one first side electrode positioned at one side of the at least one central electrode, and at least one second side electrode positioned at another side of the at least one central electrode, wherein in a display stage, the touch drive electrodes are configured to receive a common voltage signal, and wherein in a touch stage, the touch drive electrodes are configured to receive square signals one by one during respective non-overlapping time period, respectively, the square signals consisting of a first touch drive square signal and a second touch drive square signal, the at least one central electrode being configured to receive the first touch drive square signal, the at least one first side electrode and the at least one second side electrode are configured to receive the second touch drive square signal, the first coupling capacitance, formed between the at least one first side electrode and the touch detection electrodes or between the at least one second side electrode and the touch detection electrodes, and the second coupling capacitance, formed between the at least one central electrode and the touch detection electrodes, are uniformized by modulating an amplitude of the first touch drive square signal as being greater than an amplitude of the second touch drive square signal.

13. The touch display panel as claimed in claim 12, wherein the second coupling capacitance is equal to the first coupling capacitance in the direction perpendicular to the array substrate between the touch drive electrodes and the touch detection electrodes positioned in the display area.

14. The touch display panel as claimed in claim 12, wherein multiple overlapping regions are formed in the direction perpendicular to the array substrate by the touch drive electrodes and the touch detection electrodes, a first overlapping region of the multiple overlapping regions is formed in the direction perpendicular to the array substrate by one of the touch drive electrodes and one of the touch detection electrodes positioned in the display area that are far from the shift register, a second overlapping region of the multiple overlapping regions is formed in the direction perpendicular to the array substrate by one of the touch drive electrodes and one of the touch detection electrodes positioned in the display area that are close to the shift register, and an area of the first overlapping region is greater than an area of the second overlapping region.

15. The touch display panel as claimed in claim 14, wherein the area of the second overlapping region is 0.4-0.6 time as large as the area of the first overlapping region.

16. The touch display panel as claimed in claim 14, wherein the one of the touch drive electrodes positioned in the display area close to the shift register is located at outermost of all the touch drive electrodes; and the one of the touch drive electrodes positioned in the display area far from the shift register is selected from any one of the touch drive electrodes not at outermost of all the touch drive electrodes.

17. The touch display panel as claimed in claim 12, wherein the amplitude of the first touch drive square signal is 1.2-1.5 times as large as the amplitude of the second touch drive square signal.

* * * * *